United States Patent [19]

Henne et al.

[11] Patent Number: 4,610,791

[45] Date of Patent: Sep. 9, 1986

[54] DIALYSIS MEMBRANE AND METHOD OF MAKING

[75] Inventors: Werner Henne; Gustav Dünweg, both of Wuppertal, Fed. Rep. of Germany

[73] Assignee: Akzo N.V., Arnhem, Netherlands

[21] Appl. No.: 501,527

[22] Filed: Jun. 6, 1983

Related U.S. Application Data

[63] Continuation-in-part of Ser. No. 44,209, May 30, 1979, abandoned.

[30] Foreign Application Priority Data

Jun. 1, 1978 [DE] Fed. Rep. of Germany ....... 2823985

[51] Int. Cl.$^4$ .............................................. B01D 13/00
[52] U.S. Cl. .................................. 210/490; 210/500.2; 210/502.1; 210/500.23; 210/500.29
[58] Field of Search ...................... 264/199; 210/500.2, 210/490, 321.1, 502

[56] References Cited

U.S. PATENT DOCUMENTS 3,888,771 6/1975 Isuge et al. .................... 264/199 X

OTHER PUBLICATIONS

Meltzer, et al., "Optimized Cellulose ... Dialysis Applications," from Trans. Amer Soc. Artif. Int. Organ., 1968, pp. 12–18.

Primary Examiner—Frank Spear
Attorney, Agent, or Firm—John H. Shurtleff

[57] ABSTRACT

A single or multilayer dialysis membrane, constructed as a flat film, a tubular foil or especially as hollow fibers, the membrane being made of a regenerated cuprammonium cellulose which may be unmodified or partly modified by alkyl, carboxyalkyl or hydroxyalkyl groups, and said membrane being characterized by an ultrafiltration capacity at 37° C. of 7 to 30 ml/hr·m$^2$·mmHg, an average molecular permeability, based upon vitamin B12, of about $3 \cdot 10^{-3}$ to $12 \cdot 10^{-3}$ cm/min, and a water retention value of more than 145%, calculated according to the German Industrial Standard (DIN) 53814. The new membrane is prepared by the known cuprammonium process but with the addition of a finely ground CuO with a maximum particle size of 20 microns to the standard cuprammonium solution. After casting, extruding or spinning this solution into a coagulating bath, e.g. an alkaline coagulating bath, the regenerated and shaped cellulosic film, foil or filament is given an acid treatment, preferably with sulfuric acid, sufficient to substantially remove the solid CuO particles and to provide a significantly higher pore volume content and other favorable properties in the final membrane.

22 Claims, No Drawings

DIALYSIS MEMBRANE AND METHOD OF MAKING

This application is a continuation-in-part of our prior application, Ser. No. 44,209, filed May 30, 1979, now abandoned.

BACKGROUND OF THE INVENTION

This invention relates to a dialysis membrane of regenerated cellulose.

Dialysis membranes of regenerated cellulose are known and have been used extensively in artificial kidneys. Above all, it has been especially preferred to use dialysis membranes which have been regenerated from cuprammonium solutions, i.e. a regenerated cuprammonium cellulose. Prior processes for the production of such membranes are practically no different from the processes used for many years to produce cellulosic films. A description may be found, for example, in "Ullmanns Encyclopadie, der technischen Chemie", 3rd Edition, 1960, Vol. 5, pages 204 ff and Vol. 11, pages 260 ff.

These known dialysis membranes, which consist of regenerated cellulose according to the cuprammonium process, are characterized by a suitable ratio of hydrodynamic permeability to diffusive permeability, by such a pore size that the passage of protein substances and other high molecular weight components of the blood are prevented, by a good compatibility with blood as well as by good mechanical properties for use in dialysis equipment.

When using dialysis membranes produced from other materials, one frequently finds a higher hydrodynamic permeability (water permeability) but a lower diffusive permeability (for molecules of intermediate molecular weight). These other known dialysis membranes are made from polyacrylates, polysulfones, polyvinyl alcohols, polycarbonates, cellulose acetate and cellulose nitrate. The cellulose acetate and cellulose nitrate are more or less strongly saponified. These types of membranes are preferably used for blood filtration treatments.

Earlier in this art, blood filtration was introduced as a method of treatment for dialysis patients suffering from high blood pressure. For the reinfusion of large amounts of fluid into the human blood stream, use was made of membranes for the dialysis treatment which exhibited a high hydrodynamic permeability while accepting the disadvantage of lesser diffusive permeability exhibited by the known types of membranes.

SUMMARY OF THE INVENTION

It is the primary object of the present invention to provide a new dialysis membrane with a diffusive permeability which is at least as high as that obtained with known membranes as ordinarily produced by the cuprammonium process while exhibiting a distinctly higher hydrodynamic permeability and retaining good compatibility with blood and excellent mechanical properties. The outstanding properties of the new regenerated cuprammonium cellulose membranes will be apparent from the following description.

It has now been found in accordance with the invention, that the foregoing object is achieved by means of a dialysis membrane of regenerated cellulose which has been regenerated from a cuprammonium solution and which is characterized by (a) an ultrafiltration capacity of 7 to 30 ml/hr·m²·mmHg (corresponding to 14 to 60 pm·s$^{-1}$·Pa$^{-1}$), (b) an average molecular permeability for vitamin B12 of 3·10$^{-3}$ to 12·10$^{-3}$ cm/min (corresponding to 0.49 to 2.0 μm·s$^{-1}$) and (c) a water retention capacity of more than 145% according to DIN 53 814. The new membrane is further characterized by (d) a cutoff for substances with a molecular weight from about 55,000 up to about 80,000 dalton (atomic mass unit), the cutoff being defined as the molecular weight of a substance which exhibits in the membrane a screening coefficient S of 0.02.

DETAILED DESCRIPTION OF THE INVENTION

The preparation of the novel cuprammonium cellulose membrane according to the invention is described more fully below as illustrated by the working examples. In general, the membrane is prepared in a conventional manner but with the addition to the initial standard cuprammonium solution of a finely ground copper oxide (CuO) having a maximum particle size of about 20 microns. The proportion of this fine, powdery copper oxide may vary but is on the order of about 35% CuO to 65% cellulose, measured as percentage by weight of solid material in the solution. In practice, it has been found that the proportion of CuO powder to cellulose should be in a range of about 1:4 to 4:5, preferably in a range of about 1:3 to 2:3. The content of cellulose in a standard cuprammonium solution may be from 8 to 12%, preferably about 8-10%, based on the total weight of the standard solution.

Regeneration of a film, foil or tubular fiber from the cuprammonium solution is generally conventional, preferably using an alkaline (NaOH) coagulating bath or liquor. After rinsing with water, the regenerated cellulose is then treated in accordance with the invention with at least one acid ($H_2SO_4$) treatment bath sufficient to remove the copper. After being washed acid free, the membrane is preferably treated with a solution of glycerin in water and then dried at a temperature below 100° C., e.g. up to about 85° C. and preferably from about 55° C. to 80° C.

The properties of the membranes are significantly improved, particularly in a combination of a number of particularly desirable properties, using conventional measurement procedures as follows.

a. Ultrafiltration Rate

An important criterion in appraising the performance of a dialysis membrane is its hydraulic permeability, which is commonly referred to as the ultrafiltration rate (UFR), defined as the liquid volume permeating the membrane per unit time at a constant pressure and per unit of surface area. The measurement of the ultrafiltration rate is also carried out at a constant temperature. In equation form, the ultrafiltration rate is expressed as:

$$UFR = \frac{\Delta V}{\Delta t \cdot F \cdot p} \quad \frac{ml}{hr \cdot m^2 \cdot mm\, Hg}$$

wherein
ΔV = permeated liquid volume (ml),
Δt = passage time (hrs),
F = Surface area (m²), and
p = Pressure (mm Hg).

For measurement in flat film membranes, including tubular foils, a physiological solution of common salt (0.9 gram NaCl in 100 ml H₂O) is forced with a pressure of 0.6 bar (450 mmHg) through a dialysis membrane sample placed in a millipore filter No. YY 30.090.00. The volume passing through the membrane sample is measured at 10 minute intervals in a horizontally mounted and calibrated capillary tube. The axis of this measuring tube is at the level of the liquid surface of the supply container standing under the desired nitrogen (N₂) feed pressure (thereby excluding hydrostatic pressure). In order to control the temperature of the measuring apparatus, the filters for the membrane samples are washed on all sides by water at a constant temperature (37° C.).

The samples must be supplied in moistureproof containers, since a change of moisture in the sample has an irreversible effect on its ultrafiltration rate due to the structural alteration of the membrane. The testing is carried out in a conditioned room at 35% rel. hum. and 23° C.

Square pieces of membrane are required with dimensions of about 15×15 cm. From flat foils that are supplied in full casting width, there are cut 7 pairs of samples, one part of each pair serving as reserve for any necessary control measurements. Unless otherwise indicated, the square pieces are cut out and removed by means of a template placed over the foil width and such sample labeled for identification.

The cut out foil pieces or sections are allowed to soak and swell individually in beakers which are protected with watchglasses against dust, using double distilled water. The swelling (soaking) time is at least one hour. However, for reasons of operating rhythm and convenience, this soaking can be extended without trouble up to 2 days.

Between taking of the samples from the moisture tight containers and placing them in the beakers, there must be a lapse of time of only a few minutes, so that influences of climate on the membrane will be avoided.

The millipore filtration apparatus is located, at first still without a cover plate, in the testing tank filled with water. The thermostat is turned on, and by refilling with distilled water or by regulation of the absorption of the thermostat, the water level is adjusted in such a way that it remains 1 cm above the teflon plate of the filtering apparatus. The nitrogen stream is then started, and the pressure adjusted to exactly 0.60 bar=450 mm Hg.

The foil to be tested is brought onto the teflon plate by floating it thereon, applying as little tractive force as possible in order not to damage the film. When it is certain that no air bubbles are present under the foil, the cover is set in place and screwed tight. Through a suitable feed pipe or connecting piece, liquid is added to the filter until it runs over. The finished filter is now connected to the apparatus, the stopcock opened and the connecting piece rendered free of air by refilling and ventilating. The temperature is checked to see that it remains constant at 37° C., and the water level in the tank is maintained at 1 cm over the millipore filtration apparatus.

When opening the stopcock, the filter is brought into connection with the supply bottle. 15 minutes are allowed as the run-in time and then at zero point of time, the meniscus is let down in the capillary tube. At 3 intervals of 10 minutes each (exact to 1 second), the position of the meniscus is again read. The volume is calculated for the liquid passing through in three consecutive time segments of 10 min. each. If the differences are less than 0.02 ml/10 min. and no variation of the values is to be ascertained, the measurement is in order and terminated. Otherwise, leakage is present and the measurement must be repeated on another piece of film.

If another film is to be measured immediately thereupon, the liquid flow-through is merely stopped, the foil is changed in the filtration apparatus and again ventilated. After completion of all the measurements of the day, the nitrogen supply is closed and the apparatus released from pressure.

In correspondence to the relation $$UFR = \frac{\Delta V}{\Delta t \cdot F \cdot P},$$

the ultrafiltration rate is determined from the volume $\Delta V$ of liquid which permeates through the effective surface area F at a constant pressure p and over the time $\Delta t$.

The constant values are as follows:

| | |
|---|---|
| The time, | $\Delta t = 10$ min. $= 1/6$ hr.; |
| The effective surface area of the 90 mm filter, | $F = 43.2$ cm² $= 0.00432$ m²; |
| The pressure, | $p = 0.6$ bar $= 450$ mmHg |

The volume $\Delta V$, which varies in each case, is determined as the mean value of three individual measurements, for example:

| $\Delta t$ (min.) | Reading of the meniscus (ml) | $\Delta V$ (ml) |
|---|---|---|
| 0.00 | 1.75 | — |
| 10.00 | 2.40 | 0.65 |
| 20.00 | 2.40 | 0.64 |
| 30.00 | 3.69 | 0.65 |

Mean value $\bar{x}$
$\Delta V = 0.65$

The ultrafiltration rate is then calculated:

$$UFR = \frac{0.65 \text{ ml}}{(1/6 \text{ hr.})(0.00432 \text{ m}^2)(450 \text{ mm Hg})} \quad \frac{2.01 \text{ ml}}{\text{hr} \cdot \text{m}^2 \cdot \text{mm Hg}}$$

or summarizing the constants into one factor:

$$UFR = 3.09 \cdot \Delta V = 3.09 \cdot 0.65 = \frac{2.01 \text{ ml}}{\text{hr} \cdot \text{m}^2 \cdot \text{mm Hg}}$$

The result is given for each foil piece individually, rounded to two decimal places. From two values of a parallel determination, there is calculated the mean (average) value.

The standard deviations of the UFR rates, for the measurement made in the 3 volume readings, has been found to be better than $$S = \pm 0.04 \frac{\text{ml}}{\text{h} \cdot \text{m}^2 \cdot \text{mm Hg}}, \text{ or}$$

$$V = \pm 1.65\%$$

The standard deviation and variance betweeen the two parallel measurements can rise up to twice the above values, depending upon the type of foil.

In the measurement of hollow fibers, liquid is pressed through a hollow fiber bundle with a pressure of 0.2 bar (=150 mm Hg). In a lined up measuring pipette, there is measured the liquid volume that has permeated. During the measurement, the hollow fiber bundle is in a water bath with a constant temperature of 37° C.

In order to exclude the hydrostatic pressure, the meniscus in the pipette at the commencement of the measurement must be at the same level as the water level of the water bath.

The tank is filled up to the mark with fully desalted water, which is maintained with a thermostat at a temperature of 37° C. A 5 liter flask as a supply container is filled with liquid and serves to fill the measuring pipettes. The pressure in the system is adjusted to a constant value of 0.2 bar (150 mm Hg).

A hollow fiber cell, i.e. a unit with a plurality of hollow fibers fixed or embedded at either end, is carefully slid into a tube end coming from a stopcock. In this operation, one must be careful that the embedding of the hollow fibers is not damaged, and that the hollow fibers are not bent or broken. The other end of the cell is held high with one band while the stopcock is to be opened with the other hand, so that the air from the tube end and the hollow fibers, supported by the upward fluid force, can escape upwardly. When the liquid overflows, the cell is rapidly introduced into the other tube end and turned, so that the cell is immersed in the temperature controlled vessel.

The air bubbles that are still present in the last tube end, are released upwardly over the tube clamp.

Afterwards, if there should become visible a severe liquid loss in the measuring pipette, then it is a matter of leakages, which may arise through a faulty embedding of the hollow fibers or through a bent or broken hollow fiber. Such tests are thrown out as being in error.

Before the start of the measurements proper, the hollow fibers must also be subjected to a swelling or soaking time of 15 minutes.

After 30 minutes, the meniscus level of the measuring pipette is read. The difference is the volume of the liquid that has passed through within 30 minutes.

After the first measurement, there follows in each case immediately a second measurement in the same manner, beginning with the same meniscus level as at the beginning of the first measurement (double determination).

In correspondence to the relationship $$UFR = \frac{\Delta V}{\Delta t \cdot F \cdot P},$$

the ultrafiltration rate is determined from the volume of water which permeates through the total surface area of the hollow fibers used at the constantly maintained pressure. The effective surface area F is calculated from the product of the inner surface area $d_i \cdot \pi \cdot l_o$ and the number n of the fibers:

$$F = n \cdot l_o \cdot d_i \cdot \pi$$

$d_i$ = Inside diameter, i.e. the diameter of the lumen of the hollow filament. (The hollow fibers of each type are supplied with data sheets giving this measurement of the inside diameter.)

$l_o$ = length of the individual filaments (The length is measured in the tension-free, dry state of the cell with the hollow fibers stretched from embedding to embedding).

The results of the double determination are arithmetically averaged in each case.

b. Average Molecular Permeability

The diffusive permeability in dialysis membranes is a measure of the permeability of the membrane for dissolved substances and is dependent, aside from membrane, upon the molecular weight of the dissolved substances. As a test material in place of typical uremic poisons of medium molecular weight, a solution of 100 mg/l of vitamin B12 is used to determine the average molecular permeability in the determination of this property for a given membrane. The concentration differences are measured between two different concentrated initial solutions on both sides of the membrane over a period of time. The average molecular permeability is then calculated according to the following equation when using a vitamin B12 solution:

$$\text{Average molecular permeability} = \frac{\ln \Delta C_1 / \Delta C_2}{A(1/Va + 1/Vb)(t_2 - t_1)}$$

wherein:

$\Delta C_1$ = measured concentration difference between both sides of the membrane at the time $t_1$;
$\Delta C_2$ = measured concentration difference between both sides of the membrane at the time $t_2$;
A = membrane surface area; and
Va and Vb = volume of each of the two chambers which are separated by the membrane.

For the measurement of the vitamin B12 permeability for hollow fibers, the bundle of hollow fibers (test cell) are carefully slid onto the cover of a dialysis vessel of ca. 900 ml content at both tube ends, suspended in the dialysis vessel and the cover locked with four clamping members onto the vessel. The pump of a thermostat is adjusted in such a way that the liquid level in the dialysis vessel reaches the height of the upper edge of the outlet opening. This corresponds, for example, to a pump performance of 5.6 liters/min. Since a test cell has a surface of about 0.02 m², the pump performance of the dialysate amount comes to 280 liter/min·m².

Before commencement of the measurement the fiber bundle of the test cell is allowed to soak for about 30 minutes. The vitamin B12 solution (100 mg/liter) to be tested is then supplied to the test cell from the supply vessel by means of a membrane pump. Since the flow-through amount per m² of surface must be set to equal 200 ml/min, this value must be determined from the effective surface F of the cell:

$$F = n \cdot l_o \cdot d_i \cdot \pi$$

n = number of fibers in the cell
$d_1$ = inside diameter of the hollow filament
$l_o$ = length of the individual filaments (the length is measured in the tension free, stretched, dry state of the cell from embedding to embedding).

For example, for a cell with F=0.0205 m² there must be set a flow-through amount of $$F \cdot \frac{Q_B}{A} = \text{flow-through amount of the cell, or}$$

$$0.0205 \cdot 200 = 4.1 \text{ ml/min.}$$

First the test cell is washed with the test solution for about 5 minutes, in which process the temperature is simultaneously adjusted. Then for exactly 5 min. (by stopwatch) the solution is allowed to drop into a measuring cylinder, the amount of which is to come to 4.1·5=20.5 ml. If the amount is too much or too little, then the pump must be correspondingly readjusted. If the sample amount is exactly 20.5 ml, then two further samples are taken. The two samples are combined and placed for concentration determination into a dry, sealed Erlenmeyer flask. The stock solution and the sample are then measured in a spectral photometer at 550 nm.

Since the photometric measurement is carried out in the linear range at 550 nm, the measured extinctions can be used directly for the calculation of the permeability.

For the measurement of the vitamin B12 permeability of membranes in flat-foil or tubular foil form, an adapted dialysis cell is used. For this a flat-foil or tubular foil membrane piece of 10×10 cm is spanned after 5 minutes of moistening in distilled water over a ground core and slipped into a ground sleeve (NS 45).

It is fundamentally important for reproducible values that there be supplied to the system a constant agitating action, if possible the optimum agitation. With an increase of the agitating action, the border layer (adsorbed water skin) decreases to a limit value. Simultaneously, the dialytic permeability rises. In the given arrangement, this is achieved with an inner agitation of 430 rpm and an outer agitation of 280 rpm. The outer bath is filled with distilled water and the temperature controlled to a constant value of 37° C. Filling is carried out to such a level that the dialysis cells are immersed precisely by 1 cm. Between the miniscus inside and outside, the difference in their level should be as little as possible. The upper edge of the grinding must in no case be reached by the water surface. The concentration in the outer bath must always remain below the limit of detectability.

In the preparation of the dialysis cells, care is to be taken that the ground ring holding the membrane, even in the case of the clamped-in membrane, does not extend beyond the lower edge of the core grinding, because otherwise the agitating effect on the membrane surface is impaired.

The effective membrane surface is determined by the lower inside diameter of the core grinding.

The dialysis cells in the measuring apparatus are placed into the clamping device, filled with dialysis solution (100 mg/l vitamin B12) and agitated throughly for 15 minutes. In this way, the absorption equilibrium is adjusted as between membrane and solution. The dialysis cells are then taken out again and emptied as completely as possible.

The prepared dialysis cells are immediately clamped in place again and definitively filled from a pipette with 40 ml of vitamin B12 solution, while the agitation is maintained. Simultaneously, a stopwatch is observed. After the intended dialysis time, the dialysis cells are removed with the agitating mechanism still running.

The dialyzed solution of each dialysis cell is filled immediately after removal into an empty dry flask standing ready and then set aside for the further investigation.

The determination of the concentration is carried out by measurement of the extinction in the spectral photometer at 550 nm. The evaluation of results corresponds to that carried out with hollow fibers.

The above-described methods for the measurement of (a) the ultrafiltration capacity and (b) the average molecular permeability are described in principle in "Evaluation of Hemodialyzers and Dialysis Membranes" of the U.S. Department of Health, Education and Welfare, DHEW Publication No. (NIH) 77-1294, pages 14-15, 20 and 24-26, all of these pages being incorporated herein by reference as though set forth in their entirety.

c. Water Retention Value

Membranes of exceptionally high effectiveness exhibit a water retention capacity according to DIN (German Industrial Standard) 53814 of at least 145%. With previously known dialysis membranes, the highest measured water retention capacity has been about 120 to 130%. The standard measurement of this water retention value gives the total weight of water retained by a saturated sample membrane after excess water is centrifuged, measured as a percentage by weight of the dry membrane. DIN 53814 was originally designed for testing the water retention of fibers and corresponds to ASTM D2402-65T, being readily adapted to cellulosic membranes which are absorbent materials.

From this it is to be concluded that the high flux (HDF) membranes according to the present invention possess in their wet state much coarser structures and a greater pore volume than in the case of standard Cuprophan® membranes. The pore volume constituent is directly evident from the water retention capacity.

The pore volume constituent PV is calculated from the equation (1):

$$PV = \left(1 - \frac{100}{100 + W_R}\right) \cdot 100\ [\%].$$

For the water retention capacity of 130%, which is the maximum measured in standard Cuprophan membranes, there corresponds a pore volume constituent of 56.5%. By comparison, the pore volume constituent of the new HDF membranes at their minimum water retention capacity of 145% amounts to more than 60%. Such data hold for the membranes in the swollen or moist state. In the case of membranes of a strongly swelling material, the actually effective structure is present only in the moist state. A microscopic characterization, especially of structures in the submicron range, is extremely difficult in the moist state. To provide an accurate description, one can make use of the screening coefficient curve, i.e. the screening coefficient in dependence on the molecular weight.

The screening coefficient, also identified as the "sieving coefficient", is defined as follows:

$$S = C_F/C_i$$

wherein:
  S = Screening coefficient;
  $C_F$ = Concentration of a certain substance of selected molecular weight in the filtrate;
  $C_i$ = Concentration of this substance in the solution to be filtered through.

As test substances there are used vitamin B12 (MW 1,350), inulin (MW 5,500), cytochrome C (MW 12,500), egg albumin (MW 44,000) and bovine serum albumin (MW 68,000). The concentration of these substances in the solution being filtered amounts to 100 mg/liter for vitamin B12, inulin and cytochrome C as well as to 1,000 mg/liter for egg albumin and bovine serum albumin.

The testing occurs in cells exhibiting a membrane surface area of about 100 cm², according to the cross-flow principle.

In these cells, the flow of the solution to be filtered amounts to 200 ml/min·m², and the mean transmembrane pressure (TMP) amounts to 500 mm Hg. The measurements carried out according to the above data on standard Cuprophan membranes (UFR water<5.5 ml/m²·hr·mm Hg) and the new HDF membranes (UFR water=7 ml/m²·hr·mm Hg to 30 ml/m²·hr·mm Hg) have yielded the following:

(a) In a screening coefficient vs. log MW' diagram, the screening coefficients for the corresponding membrane types are contained in an area which is defined by two curves of the form defined by the equation (2):

$$S = 1 - \frac{1}{\sqrt{2\pi}} \int_{-\infty}^{x} e^{-\frac{x^2}{2}} \cdot dx$$

wherein
S=Screening coefficient; and
$x = [\log MW - \log (MW)_{0.5}]/\sigma$, in which the parameter $(MW)_{0.5}$ corresponds to the molecular weight of S=0.5 and $\sigma$ is related to the maximum rise.

(Note: The second term of this equation 2 corresponds to the distribution function of a standardized Gauss distribution.)

(b) The parameter values for the two types of membranes are:

Standard Cuprophan membranes:

| $(MW)_{0.5} = 3000$; | $\sigma^{(1)} = 0.35$ |
|---|---|
| $(MW)_{0.5} = 5000$; | $\sigma^{(2)} = 0.27$ |

New HDF membranes:

| $(MW)_{0.5} = 7000$; | $\sigma^{(3)} = 0.45$ |
|---|---|
| $(MW)_{0.5} = 15000$; | $\sigma^{(4)} = 0.37$ |

The screening coefficients of membranes with lower UFR have values in the vicinity of the first limiting curve in each case, those with higher UFR in the vicinity of the second limiting curve.

d. The Cut-Off Values

The cut-off point or value for the standard Cuprophan membrane (measured at S=0.02) lies in the molecular weight range of $(16-18) \cdot 10^3$ dalton, while for the new HDF membranes, it lies in the range of about 55,000 up to 85,000 dalton, especially about 58,000–76,000 dalton.

The process for producing the membrane of the invention is illustrated by way of the working examples below where it will be apparent that conventional procedures are followed in the preparation of a standard cuprammonium cellulose solution which can be cast, extruded or spun and then coagulated in an alkaline liquor or bath to form a flat sheet, tubular foil or hollow fibers according to commercial practice, except that a finely ground copper oxide (CuO) is added to the standard cuprammonium solution and mixed so as to be uniformly dispersed in this so-called "spinning solution" or "spinning dope" before it is spun or otherwise cast or extruded into the desired membrane form.

The added copper oxide powder is limited to a maximum particle size of about 20 microns, preferably to a size of not more than about one-fifth, i.e. 20%, of the thickness of the membrane wall as formed by casting, extruding or spinning. After grinding with a maximum particle size of about 20 microns, the larger particles in the ground product can be separated to obtain a copper oxide additive for the standard spinning solution in which most if not all of the particles are smaller than 15 microns and preferably smaller than 10 microns. Within these ranges of particle size, one can form flat sheets, tubular foils or hollow fibers in which the copper oxide particles are either entrapped within the membrane or appear only on one side or the other of the membrane without extending over its entire wall thickness. The use of a layered membrane structure is advantageous to ensure the containment of any larger solid particles and to prevent surface voids or perforations in the membrane wall of the final product.

The usual standard cuprammonium cellulose solutions contain about 10-12% by weight of cellulose and about 4-5% Cu and 8-10% NH₃ (cf. Ullmanns Encyklopädie der technischen Chemie, 1960, Vol. 11, page 264). The cellulose is preferably obtained from cotton linters or carefully treated wood pulp fibers which have been thoroughly cleaned and purified, i.e. to provide a pure alpha-cellulose. The cellulose is substantially completely dissolved or may be partly colloidally dispersed in an initial solution of cupritetrammino sulfate and cupritetrammino hydroxide (sulfate:hydroxide ratio of 1:3) as prepared, for example, by adding caustic soda (NaOH) to a copper sulphate solution and dissolving the precipitate, which is a basic copper sulphate, in aqueous ammonia. The purified cotton linters or wood fibers are added to this solution with considerable mixing. A good spinning solution is then obtained by adding just sufficient caustic soda to convert the cupritetrammino sulphate present into the corresponding cupritetrammino hydroxide. In the German language, "cuprammonium" is descriptively named "Cuoxam", but for purposes of the present specification, the term "cuprammonium" is to be understood as generic to both the initial and final solution in which the cellulose is dissolved. Cuprammonium cellulose spinning solutions with a somewhat lower Cu content are also known, e.g. from U.S. Pat. No. 3,888,771. For purposes of the present invention, the somewhat higher content of dissolved copper, e.g. 4–5% is more favorable, this range excluding the subsequently added solid CuO particles.

The finely ground copper oxide is preferably mixed into the already prepared standard cuprammonium solution after it has been filtered and deaerated, with good mixing to provide a relatively uniform dispersion of the solid particles.

The alkaline coagulation bath is conventional although it is possible in principle to coagulate by using pure water as in the classical production of a "Bemberg" yarn, or else by using an acidic aqueous solution. An alkaline aqueous solution is preferable because it is believed to provide a stronger and less brittle regenerated cellulose product. Thus, one can advantageously use a coagulating bath of about 5% caustic soda (NaOH) in water or, more generally, an aqueous coagulating bath containing from 1 to 8%, preferably 2–6%, by weight of NaOH. The coagulating bath may also contain dissolved copper and ammonia in small proportions.

After the cellulose is coagulated, it is then treated in the form of the initially developed sheet, foil or hollow fiber with at least one acid bath, preferably a sulfuric acid bath, in order to dissolve out the dispersed solid particles of copper oxide. This acid leaching step is preferably accomplished in two stages, e.g a first stage with a concentration of about 120 to 200 g/l $H_2SO_4$, preferably about 145 to 170 g/l $H_2SO_4$, at a slightly elevated temperature of about 45°–75° C., preferably about 55° to 65° C., and for a period of time which is sufficient to fully neutralize the alkali in the cellulosic sheet, foil or hollow tube. The second stage is preferably carried out at a somewhat lower $H_2SO_4$ concentration, e.g. about 80–120 g/l $H_2SO_4$, preferably 90–110 g/l $H_2SO_4$, and at a somewhat higher temperature, e.g. about 70°–90° C. and preferably about 75°–85° C. The time of treatment in the first stage can be quite short, e.g. usually less then one minute, preferably about 10–30 seconds, while the second stage lasts for a longer period of time, e.g. up to about 10 minutes and preferably about 4–7 minutes. The first stage may be a neutralization requiring only a short period of time whereas the second stage is long enough to substantially leach out the finely distributed copper oxide particles, creating a fine microporous structure in the membrane wall. It is also feasible to combine both stages into one or else to use several different stages with different treatment times. In all cases, it is desirable to substantially completely remove all of the solid CuO particles by means of this acid leaching step.

After the acid treatment steps or stages, the membrane is washed with warm water until acid-free and is then preferably treated in a warm glycerin solution, e.g. having a concentration of about 140–240 g/l, preferably about 180–220 g/l of glycerin in water, the water temperatures ranging from about 25°–50° C. in these subsequent steps, preferably about 25°–35° C. for the glycerin/water treatment. The membrane is finally dried at temperatures up to about 75° C., preferably at about 50°–70° C. The "dry" membrane is then ready for use as a dialysis membrane.

The layer thickness or wall thickness of the dialysis membrane generally falls between about 1 and 100 microns, measured at 50% relative humidity and 20° C. The thickness is preferably in a range of about 5–40 and especially about 10–20 microns. The comparatively high water retention capacity of the dialysis membranes according to the invention has a considerable influence on the measurement of the layer or wall thickness. For this reason, it is absolutely necessary to maintain exact conditions of temperature and relative humidity in measuring an individual layer or wall thickness.

In order to favorably influence the structure of the membrane and to provide chemically reactive groups, a portion of the cellulose in the cuprammonium solution can consist of a chemically modified cellulose. Cellulose esters, such as cellulose acetate, cellulose propionate and cellulose nitrate are not suitable, however, because free acids can split off through saponification so as to get into the blood of the patient and develop damaging side effects injurious to the health of the patient. In one embodiment of the invention, alkyl cellulose is introduced up to about 30%, with reference to the weight of cellulose in the cuprammonium solution, in order to influence the structure of the membrane. Hydroxyalkyl cellulose and especially carboxyalkyl cellulose are suitable for introducing chemically reactive groups because these groups take up heparin for example.

One preferred structural embodiment of the invention resides in the formation of a flat sheet or foil or else a tubular foil. For the construction of a very compact dialyzer, membranes are especially suitable when formed as hollow fibers which can be installed in the dialyzer as a hollow fiber bundle.

An especially preferred embodiment of the invention resides in the development of the dialysis membrane according to the invention out of two or more layers of which at least one layer exhibits the required high ultrafiltration capacity and the high average molecular permeability. This use of multiple layers in the cellulosic membrane avoids so-called leakage points through which the blood can sometimes pass out into the dialysate. The invention also lends itself to the provision of a dialysis membrane, for example, in which one special layer is introduced with a chemically modified cellulose having certain chemically reactive groups on which certain chemical additions can occur, or in which a single layer is formed with a chemically modified cellulose which in all cases exhibits good mechanical properties capable of being imparted to the membrane without reducing its high ultrafiltration capacity or its high average molecular permeability to any appreciable extent.

A further improved embodiment of the dialysis membrane according to the invention is provided by introducing into one layer of a multilayer membrane of regenerated cuprammonium cellulose up to 85% by weight of adsorbent particles which are embedded in the layer, preferably as a uniform dispersion. With this type of membrane, a dialysis assisted by adsorption makes possible a simultaneously higher ultrafiltration, which in turn permits a rapid recovery, especially with patients having a critical condition. Likewise, this type of membrane permits the treatment of other forms of illness such as kidney diseases without use of dialysate, something which substantially facilitates the treatment procedure. Other examples of treatable conditions with this membrane include schizophrenia and psoriasis.

As suitable adsorbents, there can be used active carbon, such as charcoal, oxides such as aluminum oxide or zirconium oxide, zirconium phosphate, silicic acid and/or silicates. These adsorbents are used in very finely divided form and can be used individually or in any combination, in the same layer or in separate layers, one under the other. These adsorbent particles are embedded in the cellulosic layer, preferably so as to be completely enclosed or encapsulated by any given layer. It is especially advantageous for each adsorbent to be situated individually in a separate layer, preferably using appropriately selected different amounts of adsorbent in each case for the best results.

The following examples illustrate especially preferred procedures for making the dialysis membranes of the invention, and variations in these actual procedures will be readily apparent to those skilled in this art without departing from the spirit or scope of the invention. These examples also illustrate the marked technical advance achieved by the invention in comparison to previously known dialysis membranes.

EXAMPLE 1

A pulverulent CuO was ground in a jet mill, also known as a fluid-energy mill, to a maximum particle size of about 20 microns.

5 Grams of this finely ground CuO was admixed into 103 grams of standard cuprammonium solution as commonly used for the production of cellulosic membranes, such that there is a uniform distribution of 35% CuO and 65% cellulose, measured as percentage by weight of solid material in the solution. The standard cuprammonium solution has been identified in the description above, and in this case consisted of approximately 9.05% cellulose, 3.92% Cu and 6.98% $NH_3$, the cellulose being in the form of pure cotton linters thoroughly mixed into the initial solution before adding the finely ground CuO.

With both the cellulose and the solid CuO particles uniformly dispersed, the solution was evenly scraped onto a glass plate with a doctor blade. The 110 micron thick layer was treated for 20 seconds with an alkaline liquor of 110 g/l NaOH, 4 g/l Cu and 10 g/l $NH_3$, thereafter rinsed for 20 seconds in water of room temperature then placed in an acid bath of 160 g/l $H_2SO_4$ and 12 g/l Cu at 60° C. for 30 seconds and finally treated for 5 minutes in an 80° C. heated sulfuric acid having a concentration of 100 g/l $H_2SO_4$ and 1 g/l Cu.

The membrane thus obtained was thereafter washed acid free in warm water at 50° C. and treated in a 25° C. warm glycerin solution of 200 g/l glycerin in water and then dried on an 80° C. heated plate. The membrane thickness, measured at 50% rel. humidity and 20° C., amounted to 15 microns; the ultrafiltration capacity amounted to 15 ml/hr·m2·mm Hg; the average molecular permeability (vitamin B12) amounted to 8 cm/min; and the water retention value according to DIN 53814 amounted to 195%.

EXAMPLE 2

4.3 kg of a finely ground CuO, obtained as in Example 1, was mixed with 104 kg of a standard cuprammonium solution for the regeneration of cellulose, here consisting of 9.03% cellulose, 3.88% Cu and 6.70% $NH_3$. The resulting mixture was extruded from an annular or ring-slotted die into an alkaline bath of 160 g/l NaOH, 4 g/l Cu and 10 g/l $NH_3$. The coagulation time amounted to 30 seconds.

The treatment of the resulting film with acid, water and glycerin then took place analogously to the manner described in Example 1. A 19 micron thick membrane was obtained after drying at 60° C., the membrane possessing an ultrafiltration capacity of 10 ml/hr·m2·mmHg, an average molecular permeability of 5.5 cm/min, and a water retention value (DIN 53814) of 165%.

EXAMPLE 3

7.4 kg of finely divided CuO, obtained as in Example 1, was mixed with 80 kg of a standard cuprammonium solution for the regeneration of cellulose which consisted of 8.33% cellulose, 3.82% Cu and 7.05% $NH_3$. This solution containing the solid CuO particles was extruded through a hollow filament ring-slotted nozzle with the use of isopropyl myristate as a core fluid into an alkaline bath of 125 g/l NaOH, 4 g/l Cu and 5 g/l $NH_3$. The further treatment of the hollow filament took place continuously by means of the baths mentioned in Example 1. The glycerin bath before drying had a concentration of 80 g/l. The drying followed at 55° C. The wall thickness of the hollow filament amounted to 16 microns and the total diameter was 215 microns. After separating the internal fluid with a water-insoluble wash fluid, the characteristic properties of the hollow filaments were tested. The ultrafiltration capacity amounted to 28 ml/hr·m2·mm Hg; the average molecular permeability amounted to 10 cm/min; and the water retention value according to DIN 53814 amounted to 210%.

A comparison was subsequently made of the ultrafiltration capacity, the average molecular permeability, the water retention value, the pore volume constituent, the $\overline{MW}_s=0.5$, the $\sigma$ value and the cut-off value of membranes according to the invention with conventional and available Cuprophan® cellulose dialysis membranes which are regenerated from standard cuprammonium solutions without the added CuO particles. The results of this comparison are shown in the following Table 1.

TABLE 1

| Membrane type | Thickness 20° C., 50% rel. hum. μ | Ultra-filtration Capacity ml/m2 · hr · mmHg | Vitamin B12 Permeability cm/min | Water Retention Capacity % | Pore Volume Content % | $\overline{MW}_{0.5}$ | $\sigma$ | Cutoff dalton |
|---|---|---|---|---|---|---|---|---|
| Membrane per Example 1 | 15 | 15 | $8 \cdot 10^{-3}$ | 195 | 66.1 | 9,000 | 0.43 | 68,500 |
| Commercial flat membrane "Cuprophan ® type PM 200" | 13.5 | 2.8 | $4.6 \cdot 10^{-3}$ | 116 | 53.7 | 3,400 | 0.33 | 16,140 |
| Membrane per Example 2 | 19 | 10.0 | $5.5 \cdot 10^{-3}$ | 165 | 62.3 | 7,500 | 0.45 | 62,740 |
| Commercial tubular membrane "Cuprophan ® tube 20μ" | 20 | 3.2 | $4.8 \cdot 10^{-3}$ | 121 | 54.5 | 3,000 | 0.35 | 16,000 |
| Membrane per Example 3 | 16 | 28 | $10 \cdot 10^{-3}$ | 210 | 67.7 | 15,000 | 0.37 | 76,000 |
| Commercial hollow fiber membrane "Cuprophan ® hollow fiber type CIJM" | 11 | 4.0 | $4.8 \cdot 10^{-3}$ | 129 | 56.3 | 5,000 | 0.27 | 18,000 |

In Table 2 below, the ultrafiltration capacities of the hollow fiber membrane of the invention are compared with the commercially available cellulose dialysis membrane hollow filaments having differing wall thicknesses. The comparison shows that merely reducing the wall thickness does not yield a marked increase in the ultrafiltration capacity such as that achieved by structurally altering the membrane in the manner of the present invention.

TABLE 2

| Type of membrane | Thickness at membrane (20° C., 50% rel. hum.) microns | Ultrafiltration Capacity ml/m² · hr · mm Hg |
|---|---|---|
| Commercial Cuprophan ® hollow fiber: | | |
| Type D2 IM | 16 | 3.4 |
| Type C1 IM | 11 | 4.4 |
| Type F1 IM | 8 | 5.5 |
| New hollow fiber membrane per Example 3 | 16 | 28.0 |

EXAMPLE 4

4.3 kg of finely ground CuO, as in Example 1, was mixed with 105 kg of a standard cuprammonium solution for the regeneration of cellulose, here consisting of 9.05% cellulose, 3.92% Cu and 6.98% $NH_3$. This solution containing the solid CuO particles was extruded through a hollow filament ring-slot nozzle, using isopropyl myristate as the core fluid, into a caustic soda bath of 125 g/liter NaOH, 4 g/liter Cu and 5 g/liter $NH_3$. The further treatment of the hollow filament occurred continuously through the baths specified in Example 1. The glycerin bath used before the drying had a concentration of 80 g/liter, and the drying took place at 55° C. The $\overline{MW}_{0.5}$ value amounted to 11,000 dalton; the $\sigma$ value amounted to 0.40; and the cutoff value amounted to 72,700 dalton. After removal of the inner core fluid with a water-insoluble wash fluid, the ultrafiltration capacity was measured and amounted to 20 ml/hr·m²·mm Hg. The average molecular permeability was 9.5 cm/min, and the water retention capacity according to DIN 53814 was 190%. The wall thickness of the hollow filament measured 16 microns; its total diameter was 215 microns.

EXAMPLE 5

4.3 kg of finely ground CuO as in Example 1, was mixed with 105 kg of the same standard cuprammonium solution for the regeneration of cellulose as used in Example 4. This solution was extruded in an annular slot extruder into a caustic soda bath of 160 g/liter $NaOH_4$, 4 g/liter Cu and 10 g/liter $NH_3$. The coagulation time amounted to 30 seconds.

The treatment of the resulting film with acid, water and glycerin occurred analogously to the manner described in Example 1. A 12 micron thick membrane was obtained after drying at 60° C., which had an ultrafiltration capacity of 16.5 ml/hr·m²·mm Hg, an average molecular permeability of 8.3 cm/min and a water retention capacity according to DIN 53814 of 165%. The value of $\overline{MW}_{0.5}$ was 9,000 dalton; the value of $\sigma$ was 0.43; and the cutoff value was 68,500.

We claim:

1. A dialysis membrane of a regenerated cuprammonium cellulose, said membrane having been dried by heat treatment at a temperature below 100° C., characterized by (a) an ultrafiltration capacity at 37° C. of 7 to 30 ml/hr·m²·mmHg, (b) an average molecular permeability, based upon vitamin B12, of $3 \cdot 10^{-3}$ to $12 \cdot 10^{-3}$ cm/min, (c) a water retention value of more than 145% by weight based upon the dry weight of the membrane, and (d) a cutoff for substances with a molecular weight from about 55,000 up to about 85,000 dalton, said cutoff being selected at a screening coefficient of $S = 0.02$.

2. A dialysis membrane as claimed in claim 1 wherein the membrane has a layer thickness of about 1 to 100 microns, measured at 50% relative humidity and 20° C.

3. A dialysis membrane as claimed in claim 2 wherein the membrane is constructed in the form of hollow fibers.

4. A dialysis membrane as claimed in claim 1 wherein the membrane has a layer thickness of about 5 to 40 microns, measured at 50% relative humidity and 20° C.

5. A dialysis membrane as claimed in claim 4 wherein the total thickness of the membrane layer is about 10 to 20 microns.

6. A dialysis membrane as claimed in claim 5 wherein the membrane is constructed in the form of hollow fibers.

7. A dialysis membrane as claimed in claim 5 having a pore volume content of more than 60%.

8. A dialysis membrane as claimed in claim 1 wherein the cellulose is produced from a cuprammonium solution in which part of the cellulose is in a chemically modified form selected from the group consisting of alkyl cellulose, carboxyalkyl cellulose and hydroxyalkyl cellulose.

9. A dialysis membrane as claimed in claim 1 wherein the membrane is constructed in the form of a flat sheet.

10. A dialysis membrane as claimed in claim 1 wherein the membrane is constructed in the form of tubular film.

11. A dialysis membrane as claimed in claim 1 wherein the membrane is constructed in the form of hollow fibers.

12. A dialysis membrane as claimed in claim 1 comprising two or more layers of said regenerated cellulose in a single membrane, at least one of said layers exhibiting said ultrafiltration capacity, said average molecular permeability and said cutoff.

13. A dialysis membrane as claimed in claim 12 wherein one of the layers of regenerated cellulose contains adsorbent particles embedded therein in an amount up to 95% by weight.

14. A dialysis membrane as claimed in claim 1 having a pore volume content of more than 60%.

15. A dialysis membrane as claimed in claim 1 wherein the permeability of the membrane remains stable when dried by said heat treatment at temperatures up to about 75° C.

16. A dialysis membrane of a regenerated cellulose obtained by admixing a pulverulent CuO having a maximum particle size of about 20 microns with a standard cuprammonium solution to provide a uniform distribution of CuO and cellulose in the solution, introducing the solution in the desired membrane shape into an aqueous coagulating bath to regenerate the cellulose containing said pulverulent CuO, and treating the resulting coagulated membrane in an acid bath at an elevated temperature and for a period of time sufficient to substantially completely dissolve and remove the pulverulent CuO therefrom, the proportion of CuO to cellulose as solids in the original solution being sufficiently high to provide a pore volume content in the final membrane of more than 60%.

17. A dialysis membrane as claimed in claim 16, characterized by (a) an ultrafiltration capacity at 37° C. of about 7 to 30 ml/hr·m²·mmHg, (b) an average molecular permeability, based upon vitamin B12, of about $3 \cdot 10^{-3}$ to $12 \cdot 10^{-3}$ cm/min, (c) a water retention value of more than 145% by weight based upon the dry weight of the membrane, and (d) a cutoff for substances with a molecular weight from about 55,000 up to about 85,000 dalton, said cutoff being selected at a screening coefficient of S=0.02.

18. A dialysis membrane as claimed in claim 16 having a total membrane thickness of about 1 to 100 microns, measured at 50% relative humidity and 20° C.

19. A dialysis membrane as claimed in claim 18 wherein said membrane thickness is about 5 to 40 microns.

20. A dialysis membrane as claimed in claim 18 wherein said membrane thickness is about 10 to 20 microns.

21. A dialysis membrane as claimed in claim 16 wherein the membrane, after treatment in the acid bath, is washed to become substantially acid free and is then dried at temperatures up to about 75° C.

22. A dialysis membrane as claimed in claim 21 wherein the membrane is washed free of acid with warm water at about 25°–50° C. and is then treated in a warm glycerin solution at about 25°–50° C. and is then dried at a temperature of about 50°–70° C.

* * * * *